(12) United States Patent
Eronen et al.

(10) Patent No.: US 10,535,179 B2
(45) Date of Patent: Jan. 14, 2020

(54) AUDIO PROCESSING

(71) Applicant: Nokia Technologies Oy, Espoo (FI)

(72) Inventors: Antti Eronen, Tampere (FI); Miikka Vilermo, Siuro (FI); Arto Lehtiniemi, Lempäälä (FI); Jussi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/849,882

(22) Filed: Dec. 21, 2017

(65) Prior Publication Data

US 2018/0190005 A1    Jul. 5, 2018

(30) Foreign Application Priority Data

Dec. 30, 2016   (EP) ..................... 16207437

(51) Int. Cl.
| | |
|---|---|
| G06T 15/00 | (2011.01) |
| G10L 21/038 | (2013.01) |
| H04S 7/00 | (2006.01) |
| G06T 19/20 | (2011.01) |
| H04S 3/00 | (2006.01) |

(52) U.S. Cl.
CPC ............ *G06T 15/005* (2013.01); *G06T 19/20* (2013.01); *G10L 21/038* (2013.01); *H04S 3/008* (2013.01); *H04S 7/303* (2013.01); *H04S 2400/01* (2013.01); *H04S 2400/11* (2013.01)

(58) Field of Classification Search
CPC ....... G06T 15/00; G06T 15/005; G06T 19/20; H04S 7/00; H04S 3/008; H04S 7/303; H04S 2400/11; H04S 2400/01; H04S 2420/01; G10L 21/038; G06F 3/165
See application file for complete search history.

(56) References Cited

U.S. PATENT DOCUMENTS

| | | |
|---|---|---|
| 6,369,822 B1 | 4/2002 | Peevers et al. |
| 6,490,359 B1 | 12/2002 | Gibson |
| 8,068,105 B1 | 11/2011 | Classen |
| (Continued) | | |

FOREIGN PATENT DOCUMENTS

| | | |
|---|---|---|
| GB | 2543275 A | 4/2017 |
| GB | 2543276 A | 4/2017 |

OTHER PUBLICATIONS

Pihlajamaki et al., "Synthesis of Spatially Extended Virtual Sources with Time-Frequency Decomposition of Mono Signals", JAES, vol. 62, No. 7/8, Jul./Aug. 2014, pp. 467-484.

(Continued)

*Primary Examiner* — Maurice L. McDowell, Jr.
*Assistant Examiner* — Donna J. Ricks
(74) *Attorney, Agent, or Firm* — Harrington & Smith

(57) ABSTRACT

A method comprising: causing detection of a modification of a visual appearance of a portion of the visual scene; causing determination that the portion of the visual scene that has been modified is or includes a first portion of the visual scene that has a corresponding first sound object; causing modification of the first sound object to modify a spatial extent of the first sound object; and causing rendering of the visual scene and the corresponding sound scene including rendering of the modified portion of the visual scene in the visual scene and rendering of the modified first sound object with modified spatial extent in the corresponding sound scene.

20 Claims, 2 Drawing Sheets

(56) References Cited

U.S. PATENT DOCUMENTS

| | | |
|---|---|---|
| 2010/0272297 A1 | 10/2010 | Boretzki |
| 2011/0037777 A1 | 2/2011 | Lindahl et al. |
| 2014/0233917 A1 | 8/2014 | Xiang |
| 2014/0280515 A1* | 9/2014 | Wei .................. H04L 67/02 709/203 |
| 2014/0369506 A1* | 12/2014 | Arrasvuori ........... G01S 3/8083 381/17 |
| 2015/0003819 A1 | 1/2015 | Ackerman et al. |
| 2016/0299738 A1 | 10/2016 | Makinen et al. |
| 2017/0265016 A1* | 9/2017 | Oh ........................ H04S 7/303 |
| 2018/0054689 A1* | 2/2018 | Chen ..................... G10L 19/20 |
| 2018/0309937 A1* | 10/2018 | Yoshino ............ G06K 9/00744 |

OTHER PUBLICATIONS

European Application No. 16195060.5, "Distributed Audio Mixing", filed on Oct. 21, 2016, 24 pages.

Shah et al., "Metrics for Measuring Ideation Effectiveness", Design Studies, vol. 24, No. 2, Mar. 2003, pp. 111-134.

Smith., "Idea-Generation Techniques: A Formulary of Active Ingredients", Journal of creative behavior, vol. 32, No. 2 Jun. 1998, pp. 107-133.

Smith, "Towards a logic of innovation", The International Handbook on Innovation, Dec. 2003. p. 347-365.

Extended European Search Report received for corresponding European Patent Application No. 16207436.3, dated May 11, 2017, 7 pages.

Extended European Search Report received for corresponding European Patent Application No. 16207437.1, dated Jun. 26, 2017, 9 pages.

\* cited by examiner

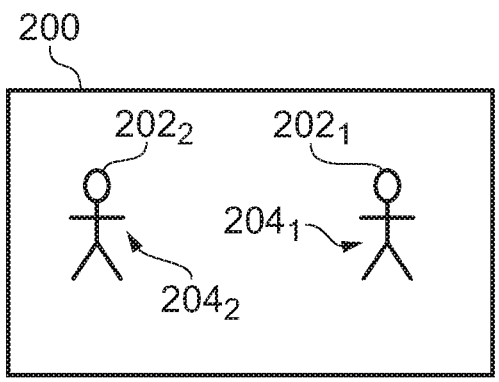
FIG. 1A
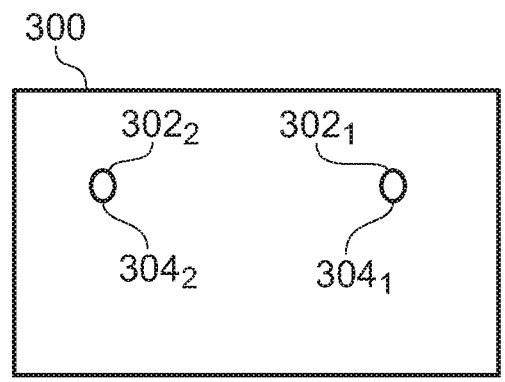
FIG. 1B
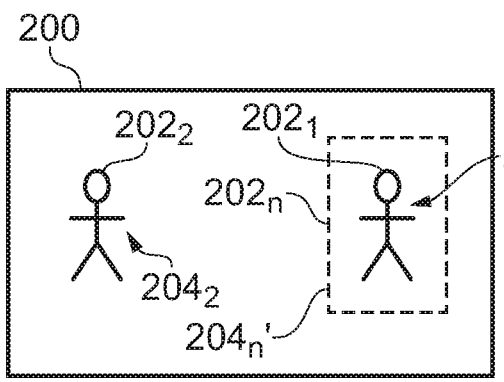
FIG. 2A
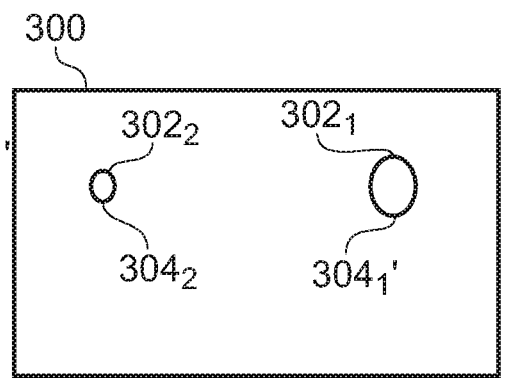
FIG. 2B
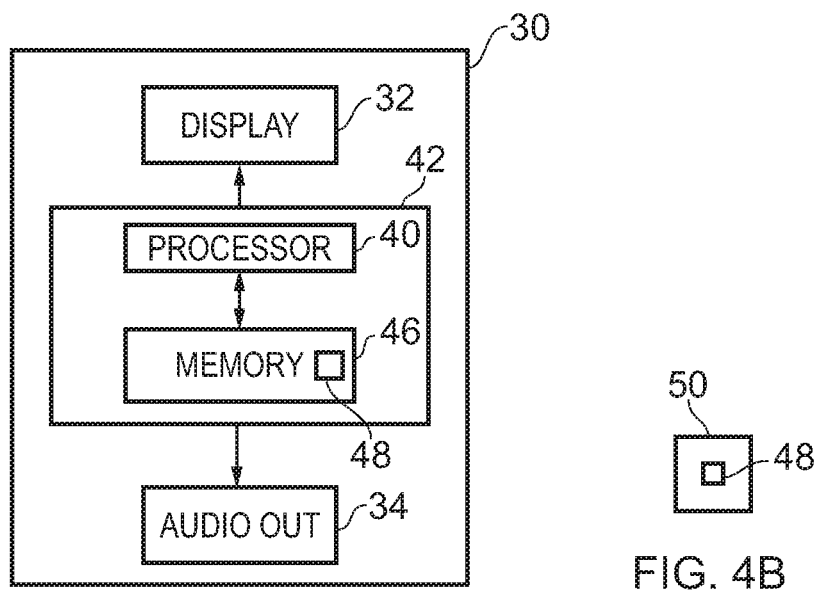
FIG. 4A
FIG. 4B

AUDIO PROCESSING

TECHNOLOGICAL FIELD

Embodiments of the present invention relate to audio processing. Some but not necessarily all examples relate to automatic control of audio processing.

BACKGROUND

Spatial audio rendering comprises rendering sound scenes comprising sound objects at respective positions.

BRIEF SUMMARY

According to various, but not necessarily all, embodiments of the invention there is provided a method comprising: causing detection of a modification of a visual appearance of a portion of the visual scene; causing determination that the portion of the visual scene that has been modified is or includes a first portion of the visual scene that has a corresponding first sound object; causing modification of the first sound object to modify a spatial extent of the first sound object; and causing rendering of the visual scene and the corresponding sound scene including rendering of the modified portion of the visual scene in the visual scene and rendering of the modified first sound object with modified spatial extent in the corresponding sound scene.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIG. 1A illustrates an example of a visual scene at a first time and FIG. 1B illustrates an example of a corresponding sound scene at the first time;

FIG. 2A illustrates an example of a visual scene at a second time and FIG. 2B illustrates an example of a corresponding sound scene at the second time;

FIG. 4 illustrates an example of an apparatus for performing the method.

DETAILED DESCRIPTION

Figure 3:
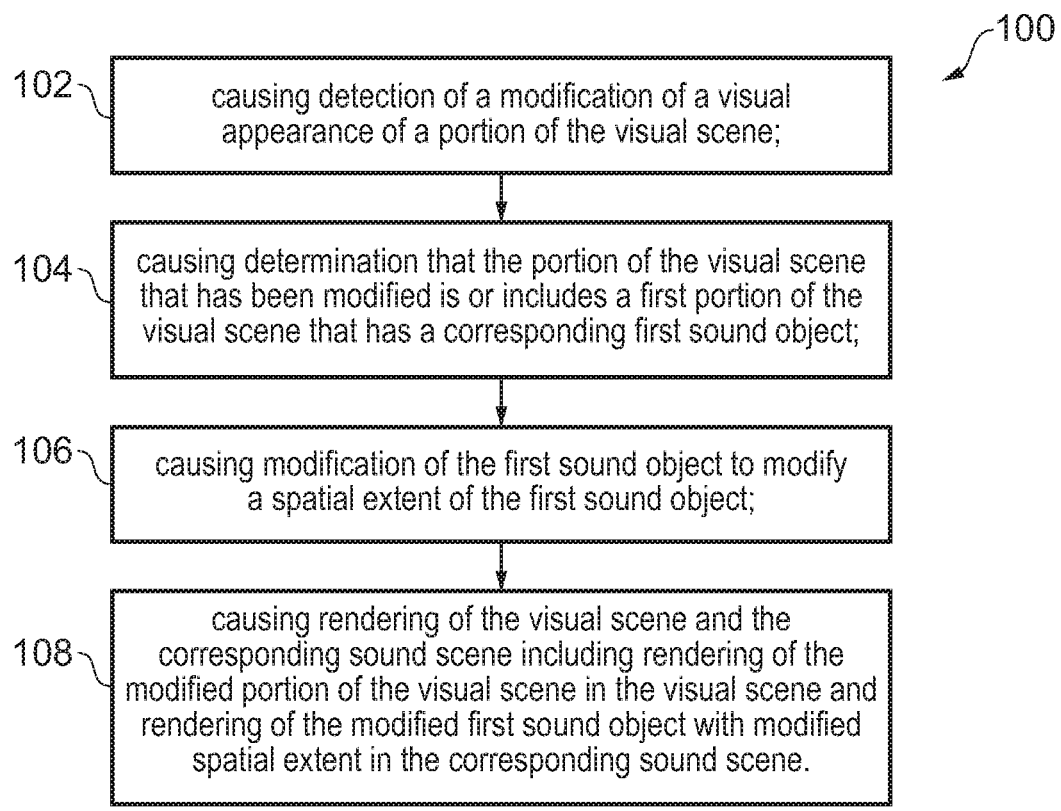
FIG. 3 illustrates an example of a method.

In this description, "rendering" means providing in a form that is perceived by a user. "Displaying" is a form of rendering for a visual scene and means providing in a form that is perceived visually (viewed) by the user.

FIG. 1A illustrates an example of a visual scene 200 as rendered. The visual scene 200 may be arbitrarily separated into portions 202 including in this example a first portion $202_1$ and a second portion $202_2$. The first portion $202_1$ has a visual appearance $204_1$ and the second portion $202_2$ has a visual appearance $204_2$.

The visual appearance 204 of the visual scene 200 is not determined by the content displayed but is determined by how that content is displayed. The visual appearance 204 may be determined by a scale at which content is displayed, a color gamut used for display, brightness, contrast and sharpness (blur).

A less sharp (blurred) portion of an image may be modeled as a sharper portion of an image that has been passed through a low-pass filter. The presence (or absence) of blur at a portion of an image (visual scene 200) may therefore be determined by taking the Fourier transform of the image portion and inspecting the Fourier transform for the absence (or presence) of higher frequency components.

It is possible for different portions $202_n$ of the same visual scene 200 to have different visual appearance $204_n$. The visual appearance $204_n$ of the different portions $202_n$ of the visual scene 200 is not determined by the content displayed but is determined by how that content is displayed. The visual appearance $204_n$ may be determined by a scale at which content is displayed, a color gamut used for display, brightness, contrast and sharpness (blur).

It is possible for different portions 202 of the same visual scene 200 to have their visual appearance $204_n$ modified independently of other portions 202 of the same visual scene to have a modified visual appearance $204_n'$. The modified visual appearance $204_n$ of the different portions $202_n$ of the visual scene 200 is not determined by modification of the content displayed but is determined by modification of how the same content is displayed. The modification of the visual appearance $204_n$ may be determined by modification of one or more of: the scale at which content is displayed, the color gamut used for display, the brightness, the contrast and the sharpness (blur).

In some but not necessarily all examples, a user changes the visual appearance 204 using an input device, like a mouse, motion gesture controller or similar.

FIG. 2A illustrates an example of the visual scene 200 as rendered. The visual scene 200 is the same visual scene as rendered in FIG. 1. However, a portion $202_n$ of the visual scene 200 has a modified visual appearance $204_n'$.

In this example, the portion $202_n$ of the visual scene 200 that has the modified visual appearance $204_n'$ is or includes the first portion $202_1$ of the visual scene 200. Consequently the first portion $202_1$ of the visual scene 200 has a modified visual appearance $204_1'$ FIG. 1B illustrates an example of a sound scene 300 as rendered.

A multichannel audio signal can represent a sound scene 300 relative to an origin and can be rendered by an audio decoder to produce a rendered sound scene to a listener at the origin. The sound scene 300 comprises a plurality of sound objects 302 at different positions r and with different spatial extents 304.

The sound scene 300 comprises one or more sound objects 302. A sound object 302 is a sound that may be located within the sound scene 200. A rendered sound object 302 represents a sound rendered from a particular position r with a particular spatial extent.

The rendered sound scene 300 and the rendered visual scene 200 are 'corresponding'. That is, the rendered sound scene 300 and the rendered visual scene 200 are time and space aligned (they occupy the same space at the same time) and a notional listener whose point of view defines the sound scene 300 and a notional viewer whose point of view defines the visual scene 200 are at the same position and orientation: that is they have the same point of view.

"Correspondence" or "corresponding" when used in relation to a sound object 302 and a portion 202 of the visual space 200 means that the sound object 302 is rendered at a position that corresponds to a position of that portion 202 of the visual space 200.

In the example of FIG. 1B, the sound scene 300 comprises a first sound object $302_1$ that corresponds with a first portion $202_1$ of the visual scene 200 in FIG. 1.

In the example of FIG. 2B, the sound scene 300 comprises a modified first sound object $302_1$ that corresponds with the first portion $202_1$ of the visual scene 200 in FIG. 1 that is or is included within the modified portion $202_n$ of the visual scene 200.

As a consequence of modification of the visual appearance $204_1$ of the first portion $202_1$ of the visual scene 200, the corresponding first sound object $302_1$ has a modified spatial extent $304_1'$ (the spatial extent 304 of the first sound object $302_1$ has increased). In FIG. 1B, the first sound object $302_1$ has a smaller spatial extent 304 that in FIG. 2B.

The sound scene 300 may be considered to be a collection of spatial channels where each spatial channel is a different direction. In some examples, the collection of spatial channels may be globally defined for all sound objects. In other examples, the collection of spatial channels may be locally defined for each sound object. The collection of spatial channels may be fixed or may vary dynamically. In some but not necessarily all examples, each spatial audio channel may be rendered as a single sound source using amplitude panning.

For example, in polar co-ordinates the direction of the spatial channel $S_{nm}$ may be represented by the couplet of polar angle $\vartheta_n$ and azimuthal angle $\Phi_m$. Where $\vartheta_n$ is one polar angle in a set of N possible polar angles and $\Phi_m$ is one azimuthal angle in a set of M possible azimuthal angles.

A sound object 302 at position z may be associated with the spatial channel $S_{nm}$ that is closest to Arg(z).

If a sound object 302 is associated with a spatial channel $S_{nm}$ then it is rendered as a point source.

A sound object 302 may however have spatial extent 304 and be associated with a plurality of spatial audio channels. For example a sound object may be simultaneously rendered in a set of spatial channels {S} defined by Arg(z) and a spatial extent 304 of the sound object. That set of spatial channels {S} may, for example, include the set of spatial channels $S_{n',m'}$ for each value of n' between $n-\delta_n$ and $n+\delta_n$ and of m' between $n-\delta_m$ and $n+\delta_m$, where n and m define the spatial channel closes to Arg(z) and $\delta_n$ and $\delta_m$ define in combination a spatial extent 304 of the sound object 302. The value of $\delta_n$, defines a spatial extent 304 in a polar direction and the value of $\delta_m$ defines a spatial extent 304 in an azimuthal direction.

The number of spatial audio channels and their spatial relationship in the set of spatial channels {S}' is dependent upon the desired spatial extent 304 of the sound object 302.

A sound object 302 may be simultaneously rendered in a set of spatial channels {S}' by separating the audio signal representing the sound object 302 into multiple different frequency bands thereby creating multiple spectrally-limited audio signals and placing one of the spectrally-limited audio signals into one of the set of spatial audio channels {S}. In some but not necessarily all examples, each spectrally-limited audio signal may be rendered as a single sound source using amplitude panning.

For example, if the set of spatial channels {S} comprised X channels, the audio signal representing the sound object would be separated into X different spectrally-limited audio signals in different non-overlapping frequency bands. This may be achieved using a filter bank or by digital signal processing. Each of the X different spectrally-limited audio signals in different non-overlapping frequency bands would be provided to only one of the set of spatial audio channels {S}.

Which spectrally-limited audio signal is allocated to which spatial audio channel in the set of spatial audio channels {S} may be controlled by random allocation or may be determined based on a set of predefined rules.

The predefined rules may, for example, specify spatial-separation of spectrally-adjacent spectrally-limited audio signals above a threshold value. Thus spectrally-limited audio signals in adjacent frequency bands may be separated spatially so that they are not spatially adjacent.

In some examples, effective spatial separation of the multiple frequency bands may be maximized.

The rules may specify that movement of a sound object 302 having an extended spatial extent 304 should be achieved by not moving all of the multiple spectrally-limited audio signals distributed amongst different spatial audio channels simultaneously to different spatial audio channels but should be achieved by keeping a first set of the multiple spectrally-limited audio signals stationery with respect to their current spatial audio channels and moving a second set of the multiple spectrally-limited audio signals to different spatial audio channels.

The distance of a sound object 302 from the origin may be controlled by using a combination of direct and indirect processing of the audio signals representing a sound object 302.

The audio signals are passed in parallel through a "direct" path and one or more "indirect" paths before the outputs from the paths are mixed together. The direct path represents audio signals that appear, to a listener, to have been received directly from an audio source and an indirect (decorrelated) path represents audio signals that appear to a listener to have been received from an audio source via an indirect path such as a multipath or a reflected path or a refracted path. Modifying the relative gain between the direct path and the indirect paths, changes the perception of the distance D of the sound object 302 from the listener in the rendered sound scene 300. Increasing the indirect path gain relative to the direct path gain increases the perception of distance. The decorrelated path may, for example, introduce a pre-delay of at least 2 ms.

In some situations, for example when the sound scene 300 is rendered to a listener through a head-mounted audio output device, for example headphones using binaural audio coding, it may be desirable for the rendered sound space to remain fixed in space when the listener turns their head in space. This means that the rendered sound space needs to be rotated relative to the audio output device by the same amount in the opposite sense to the head rotation. The orientation of the rendered sound space tracks with the rotation of the listener's head so that the orientation of the rendered sound space remains fixed in space and does not move with the listener's head. The system uses a transfer function to perform a transformation T that rotates the sound objects within the sound space. For example, a head related transfer function (HRTF) interpolator may be used for binaural audio. As another example, Vector Base Amplitude Panning (VBAP) may be used for loudspeaker format (e.g. 5.1) audio.

FIG. 3 illustrates an example of a method 100 for modifying a rendered sound object 302.

At block 102, the method 100 comprises causing detection of a modification of a visual appearance 204 of a portion 202 of the visual scene 200.

At block 104, the method 100 comprises causing determination that the portion 202 of the visual scene 200 that has been modified is or includes a first portion $202_1$ of the visual scene 200 that has a corresponding first sound object $302_1$.

At block 106, the method 100 comprises causing modification of the first sound object $302_1$ to modify a spatial extent $304_1$ of the first sound object $302_1$.

At block 108, the method 100 comprises causing rendering of the visual scene 200 and the corresponding sound scene 300 including rendering of the modified portion $202_n$ of the visual scene 200 in the visual scene 200 and rendering of the modified first sound object $302_1$ with modified spatial extent $304_1$' in the corresponding sound scene 300.

Each of the blocks 102, 104, 106, 108 may be performed automatically.

In the event that the portion $202_n$ of the visual scene 200 that has been modified is not or does not include the first portion $202_1$ of the visual scene 200 that has a corresponding first sound object $302_1$, then there would be no modification of the first sound object $302_1$.

It is a requirement for modification of the extent $304_1$ of the first sound object $302_1$ for two conditions to be fulfilled. The first sound object $302_1$ corresponds to a portion 202 of the visual scene 200 and that portion 202 of the visual scene 200 has had a change in visual appearance 204.

While the above example, assumes that only a portion $202_n$ of the visual scene 200 is modified and that the modified portion $202_n$ of the visual scene 200 corresponds to only a single sound object $302_1$, in other examples the portion $202_n$ of the visual scene 200 that has been modified in visual appearance 204 is or includes one or more portions of the visual scene that each have one or more corresponding sound objects 302 that are modified in spatial extent 304.

In one example, the portion $202_n$ of the visual scene 200 that has been modified is or includes only a first portion $202_1$ of the visual scene 200 that has only a corresponding first sound object $302_1$, and only the first sound object $302_1$ is modified in spatial extent 304.

In another example, the portion $202_n$ of the visual scene 200 that has been modified is or includes only a first portion of the visual scene 200 that has multiple corresponding sound objects 302, and only the multiple corresponding sound objects 302 are modified in spatial extent 304.

In a further example (not illustrated), the portion $202_n$ of the visual scene 200 that has been modified includes not only a first portion $202_1$ of the visual scene 200 that has one or more corresponding first sound objects $302_1$ but also a second portion of the visual scene 200 that has one or more corresponding second sound objects and only the one or more corresponding first sound objects $302_1$ and the one or more corresponding second sound objects are modified in spatial extent 304.

At block 102, the detection of a modification of a visual appearance 204 of a portion $202_n$ of the visual scene 200 may comprise detection of a spatially limited modification of a visual appearance 204 of the visual scene 200. For example, only a part of the visual scene 200 is modified, and only sound objects 302 corresponding to the modified part are modified. Sound objects 302 that do not correspond to the modified part of the visual scene 200 are not modified.

At block 102, the detection of a modification of a visual appearance 204 of a portion 202 of the visual scene 200 may comprise detection of modification in visual appearance of the portion of the visual scene caused by an applied visual effect. The change in visual appearance 204 may be as a result of an editing process. For example, a blur effect may be applied to a portion 202 of the visual scene 200 representing a visual object in the visual scene.

The blur effect may be applied as an editing command by any person including a person listening to the rendered sound scene 300 and viewing the rendered visual scene 200.

A blur effect is one type of visual effect that modifies a spatial extent of a visual object. It spreads the boundaries of the visual object making them less distinct.

A blur effect decreases the visual sharpness of the portion 202 of the visual scene 200 to which it is applied. The blur effect may, for example, be modeled as a low-pass filter.

Object tracking may be used to determine when a visual object changes appearance 204. For example, tracking the object on a large macro-scale allows one to create a frame of reference that moves with the object. That frame of reference can then be used to track time-evolving changes of shape or appearance of the object, by using temporal differencing with respect to the object.

The modification of the spatial extent 304 of the first sound object 302 comprises increasing the spatial extent $304_1$ of the first sound object $302_1$ so that it too is 'blurred' like its corresponding portion $202_1$ of the visual scene 200.

Modification of the spatial extent $304_1$ of the first sound object $302_1$ may for example comprise adapting the first sound object $302_1$ so that it is no longer rendered as a point sound source.

In some but not necessarily all examples, the spatial extent $304_1$ of the first sound object $302_1$ after it has been modified is the same as a spatial extent of a first visual object corresponding to the first sound object $302_1$.

Spatial extent of a sound object may be considered to be a length L along a vector v in the sound space or lengths L along a set of vectors $v_n$ in the sound space. In some examples, the set of vectors $\{v_n\}$ may be orthogonal vectors or a minimum set of vectors that span the sound space.

Spatial extent of a visual object may be considered to be a length X along a vector v in the visual space or lengths $X_n$ along a set of vectors $v_n$ in the visual space. In some examples, the set of vectors $\{v_n\}$ may be orthogonal vectors or a minimum set of vectors that span the visual space.

As the sound space and visual space correspond, the set of vectors $\{v_n\}$ are the same vectors in each space.

The spatial extent $304_1$ of the first sound object $302_1$ after it has been modified, is the same as a spatial extent of a first visual object corresponding to the first sound object $302_1$ if for at least one value of n $L_n=X_n$.

The spatial extent $304_1$ of the first sound object $302_1$ after it has been modified, is exactly the same as a spatial extent of a first visual object corresponding to the first sound object $302_1$ if for all values of n $L=X_n$.

Modification of the first sound object $302_1$ such that it has a modified spatial extent $304_1$' occurs conditionally in dependence upon a relative size of the spatial extent $304_1$ of the first sound object $302_1$ and the spatial extent of a visual object in the visual scene corresponding to the first sound object $302_1$. For example, in some but not necessarily all examples, the spatial extent 304 of the first sound object $302_1$ may not exceed a spatial extent of a first visual object corresponding to the first sound object $302_1$.

The modification of the spatial extent 304 of a sound object 302 may occur automatically, in real time, in response to a modification in visual appearance of the corresponding portion 202 of the visual scene 200.

Further modifications in the visual appearance 204 of one or more portions 202 of the visual scene 200 cause further modifications in the spatial extent 304 of one or more sound objects 302 corresponding to those one or more portions 202 of the visual scene 200.

Referring back to FIGS. 1A and 1B which represent respectively a visual scene 200 and a corresponding sound scene 300 at a first time and FIGS. 2A and 2B which represent respectively a visual scene 200 and a corresponding sound scene 300 at a second time, later than the first time, it will be appreciated that the method 100 comprises:

at a first time, causing rendering of a visual scene 200 (FIG. 1A) and a corresponding sound scene 300 (FIG. 1B) including rendering of a first portion $202_1$ of the visual scene 200 and rendering of a first sound object $302_1$ corresponding to the first portion $202_1$ of the visual scene 200;

causing detection of a modification of a visual appearance 204 of a portion $202_n$ of the visual scene 200;

causing determination that the portion 202 of the visual scene 200 that has been modified is or includes the first portion $202_1$ of the visual scene 200 that has a corresponding first sound object $302_1$;

causing modification of the first sound object $302_1$ to modify a spatial extent $304_1$ of the first sound object $302_1$; and at a second time, causing rendering of the visual scene 200 (FIG. 2A) and the corresponding sound scene 300 (FIG. 2B) including rendering of the modified portion 202 of the visual scene 200 and rendering of the modified first sound object $302_1$ with modified spatial extent $304_1$ in the corresponding sound scene 300.

In some but not necessarily all examples, the visual scene 200 may be a virtual visual scene. A virtual visual scene may, for example be a mediated reality scene, a virtual reality scene or an augmented reality scene. A virtual reality scene displays a fully artificial virtual visual scene. An augmented reality scene displays a partially artificial, partially real virtual visual scene.

The virtual visual scene may comprise a real visual scene supplemented by one or more visual elements displayed by an apparatus to a user. The visual elements may be one or more computer-generated visual elements. In a see-through arrangement, the virtual visual scene comprises the actual real visual scene which is seen through a display of the supplemental visual element(s). In a see-video arrangement, the virtual visual scene comprises a displayed real visual scene and displayed supplemental visual element(s).

The mediated reality, augmented reality or virtual reality may be user interactive-mediated. In this case, user actions at least partially determine what happens within the virtual visual scene. This may enable interaction with a virtual object such as a visual element.

The mediated reality, augmented reality or virtual reality may be perspective-mediated. In this case, user actions determine a point of view within a virtual visual space, changing the virtual visual scene. Where the user's point of view determines the point of view within the virtual visual space, the mediated reality, augmented reality or virtual reality is first-person perspective-mediated. In some examples, a point of view may be changed by a user changing an orientation of their head or view point and/or a user changing a direction of their gaze. A head-mounted apparatus 30 may be used to enable first-person perspective mediation by measuring a change in orientation of the user's head and/or a change in the user's direction of gaze. For example, accelerometers, electronic gyroscopes or electronic compasses may be used to determine a change in an orientation of a user's head or view point and a consequential change in the real direction of the real point of view. For example, pupil tracking technology, based for example on computer vision, may be used to track movement of a user's eye or eyes and therefore determine a direction of a user's gaze and consequential changes in the real direction 15 of the real point of view 14.

FIG. 4 illustrates an example of an apparatus 30 that is operable to enable the method 100.

The apparatus 30 comprises a display 32 for displaying the visual scene 200 to a user in a form that is perceived visually by the user. The display 32 may be a visual display that provides light that displays the visual scene 200 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

The apparatus 30 comprises an audio rendering device 34 for rendering the sound scene 300 simultaneously with the display of the corresponding visual scene 200. The audio rendering device 34 may be an interface or may be a collection of one or more loudspeakers The audio rendering device 34 is controlled in this example but not necessarily all examples by the controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods 100 illustrated in FIG. 3.

The apparatus 30 may be a head-mounted apparatus that is moved automatically when a head of the user moves. The head-mounted apparatus may house sensors for point of view detection and/or selection gesture detection.

The head-mounted apparatus may be a see-through arrangement for augmented reality that enables a live real visual scene to be viewed while one or more visual elements are displayed by the display to the user to provide in combination a virtual visual scene. In this case a visor, if present, is transparent or semi-transparent so that the live real visual scene 12 can be viewed through the visor.

The head-mounted apparatus may be operated as a see-video arrangement for augmented reality that enables a live or recorded video of a real visual scene to be displayed by the display 32 for viewing by the user while one or more visual elements are simultaneously displayed by the display 32 for viewing by the user. The combination of the displayed real visual scene and displayed one or more visual elements provides the virtual visual scene to the user. In this case a visor is opaque and may be used as display 32.

Other examples of apparatus 30 that enable display of at least parts of the virtual visual scene 22 to a user may be used.

The apparatus 30 therefore comprises:

at least one processor 40; and at least one memory 46 including computer program code 48;

the at least one memory 46 and the computer program code 48 configured to, with the at least one processor 40, cause the apparatus 30 at least to perform:

causing detection of a modification of a visual appearance 204 of a portion 202 of the visual scene 200;

causing determination that the portion 202 of the visual scene 200 that has been modified is or includes a first portion $202_1$ of the visual scene 200 that has a corresponding first sound object $302_1$;

causing modification of the first sound object $302_1$ to modify a spatial extent $304_1$ of the first sound object 302; and causing rendering of the visual scene 200 and the corresponding sound scene 300 including rendering of the modified portion $202_n$ of the visual scene 200 in the visual scene 200 and rendering of the modified first sound object $302_1$ with modified spatial extent $304_1'$ in the corresponding sound scene 300.

As illustrated in FIG. 4B, the computer program 48 may arrive at the apparatus 30 via any suitable delivery mechanism 50. The delivery mechanism 50 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIG. 3 may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   causing detection of a modification of a visual appearance of a portion of a visual scene;
   causing determination that the portion of the visual scene that has been modified is or includes a first portion of the visual scene that has a corresponding first sound object;
   causing modification of the first sound object to modify a spatial extent of the first sound object based on the detected modification of the visual appearance of the portion of the visual scene; and
   placing one or more audio signals representing the modified first sound object into at least one spatial audio channel and causing rendering of the visual scene and a corresponding sound scene including rendering of the modified portion of the visual scene in the visual scene and rendering of the modified first sound object with the modified spatial extent in the corresponding sound scene.

2. A method as claimed in claim 1, wherein the modification of the visual appearance of the portion of the visual scene is caused with an applied visual effect.

3. A method as claimed in claim 1, wherein the modification of the visual appearance of the portion of the visual scene comprises modification of a spatial extent of a visual object.

4. A method as claimed in claim 1, wherein the modification of the visual appearance of the portion of the visual scene comprises modification of visual sharpness of the portion of the visual scene.

5. A method as claimed in claim 1, wherein the modification of the spatial extent of the first sound object comprises increasing the spatial extent of the first sound object.

6. A method as claimed in claim 1, wherein the spatial extent of the first sound object after it has been modified is the same as a spatial extent of a first visual object corresponding to the first sound object.

7. A method as claimed in claim 1, wherein modification of a spatial extent of a sound object occurs automatically, in real time, in response to the modification of the visual appearance of the first portion of the visual scene.

8. A method as claimed in claim 1, wherein a further modification in the visual appearance of one or more portions of the visual scene causes a further modification in spatial extent of one or more sound objects corresponding to those one or more portions of the visual scene.

9. A method as claimed in claim 1, wherein modifying the spatial extent of the first sound object comprises dividing an audio signal representing the first sound object into different frequency bands to create multiple spectrally-limited audio signals and placing each of the multiple spectrally-limited audio signals into different spatial audio channels.

10. An apparatus comprising at least one processor and at least one non-transitory memory including computer program code; the at least one non-transitory memory and the computer program code configured to, with the at least one processor, cause the apparatus at least to perform:
    cause detection of a modification of a visual appearance of a portion of a visual scene;
    cause determination that the portion of the visual scene that has been modified is or includes a first portion of the visual scene that has a corresponding first sound object;
    cause modification of the first sound object to modify a spatial extent of the first sound object based on the detected modification of the visual appearance of the portion of the visual scene; and
    cause placement of one or more audio signals representing the modified first sound object into at least one spatial audio channel and cause rendering of the visual scene and a corresponding sound scene including rendering of the modified portion of the visual scene in the visual scene and rendering of the modified first sound object with the modified spatial extent in the corresponding sound scene.

11. The apparatus as claimed in claim 10, wherein the modification of the visual appearance of the portion of the visual scene is caused with an applied visual effect.

12. The apparatus as claimed in claim 10, wherein the modification of the visual appearance of the portion of the visual scene comprises modification of a spatial extent of a visual object.

13. The apparatus as claimed in claim 10, wherein the modification of the visual appearance of the portion of the visual scene comprises modification of visual sharpness of the portion of the visual scene.

14. The apparatus as claimed in claim 10, wherein the modification of the spatial extent of the first sound object comprises increasing the spatial extent of the first sound object.

15. The apparatus as claimed in claim 10, wherein the spatial extent of the first sound object after it has been modified is the same as a spatial extent of a first visual object corresponding to the first sound object.

16. The apparatus as claimed in claim 10, wherein modification of a spatial extent of a sound object occurs automatically, in real time, in response to the modification of the visual appearance of the first portion of the visual scene.

17. The apparatus as claimed in claim 10, wherein a further modification in the visual appearance of one or more portions of the visual scene causes a further modification in spatial extent of one or more sound objects corresponding to those one or more portions of the visual scene.

18. The apparatus as claimed in claim 10, wherein modifying the spatial extent of the first sound object comprises dividing an audio signal representing the first sound object into different frequency bands to create multiple spectrally-limited audio signals and placing each of the multiple spectrally-limited audio signals into different spatial audio channels.

19. The apparatus as claimed in claim 10, wherein modification of the first sound object such that it has a modified spatial extent occurs conditionally in dependence upon a relative size of the spatial extent of the first sound object and the spatial extent of a virtual object in the virtual scene corresponding to the first sound object.

20. A non-transitory computer-readable storage medium having stored thereon computer-readable code, which, when executed with at least one processor, causes the at least one processor to perform:
    causing detection of a modification of a visual appearance of a portion of a visual scene;
    causing determination that the portion of the visual scene that has been modified is or includes a first portion of the visual scene that has a corresponding first sound object;

causing modification of the first sound object to modify a spatial extent of the first sound object based on the detected modification of the visual appearance of the portion of the visual scene; and causing placement of one or more audio signals representing the modified first sound object into at least one spatial audio channel and causing rendering of the visual scene and a corresponding sound scene including rendering of the modified portion of the visual scene in the visual scene and rendering of the modified first sound object with the modified spatial extent in the corresponding sound scene.

* * * * *